(12) United States Patent
Dai et al.

(10) Patent No.: US 12,149,470 B2
(45) Date of Patent: Nov. 19, 2024

(54) DEVICE-TO-DEVICE PERIODIC SIGNAL CONFIGURATION

(71) Applicant: QUALCOMM Incorporated, San Diego, CA (US)

(72) Inventors: Jing Dai, Beijing (CN); Chao Wei, Beijing (CN); Min Huang, Beijing (CN); Qiaoyu Li, Beijing (CN); Hao Xu, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 365 days.

(21) Appl. No.: 17/756,463

(22) PCT Filed: Dec. 12, 2019

(86) PCT No.: PCT/CN2019/124749
§ 371 (c)(1),
(2) Date: May 25, 2022

(87) PCT Pub. No.: WO2021/114157
PCT Pub. Date: Jun. 17, 2021

(65) Prior Publication Data
US 2023/0006788 A1 Jan. 5, 2023

(51) Int. Cl.
*H04W 4/46* (2018.01)
*H04B 7/06* (2006.01)
(Continued)

(52) U.S. Cl.
CPC ......... *H04L 5/0048* (2013.01); *H04B 7/0621* (2013.01); *H04L 5/0078* (2013.01); *H04W 76/14* (2018.02)

(58) Field of Classification Search
CPC .... H04B 7/0621; H04B 7/063; H04B 7/0695; H04B 7/06954; H04B 7/06968;
(Continued)

(56) References Cited

U.S. PATENT DOCUMENTS 10,652,775 B2\* 5/2020 Chendararai Kannan .................. H04L 5/0048
11,101,901 B2\* 8/2021 Yokomakura ........ H04B 17/318
(Continued)

FOREIGN PATENT DOCUMENTS

| CN | 105794250 A | 7/2016 |
| EP | 3487083 A1 | 5/2019 |
| WO | WO-2019059739 A1 | 3/2019 |

OTHER PUBLICATIONS

CATT: "Feature Lead Summary on AI 7.2.4.3 Sidelink Synchronization Mechanism", 3GPP TSG RAN WG1 Meeting #99, 3GPP Draft, R1-1912157, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, 41 Pages, Nov. 25, 2019, (Nov. 25, 2019), XP051830565, Section 5.
(Continued)

*Primary Examiner* — Frank Duong
(74) *Attorney, Agent, or Firm* — Harrity & Harrity, LLP (57) ABSTRACT

Various aspects of the present disclosure generally relate to wireless communication. In some aspects, a first user equipment (UE) may transmit a first set of periodic signals associated with a first set of spatial relationships in a first set of periodic signal transmission occasions associated with a first periodicity; and transmit one or more second sets of periodic signals with a second set of spatial relationships in one or more second sets of periodic signal transmission occasions associated with a second periodicity, wherein the one or more second sets of periodic signal transmission occasions occur before a next first set of the periodic signal transmission occasions. Numerous other aspects are provided.

19 Claims, 4 Drawing Sheets

(51) Int. Cl.
 H04L 5/00 (2006.01)
 H04W 76/14 (2018.01)
(58) Field of Classification Search
 CPC ..... H04L 5/0023; H04L 5/0048; H04L 5/005; H04L 5/0078; H04W 4/40; H04W 4/44; H04W 4/46; H04W 76/14; H04W 88/04
 See application file for complete search history.

(56) References Cited

U.S. PATENT DOCUMENTS

| | | | | |
|---|---|---|---|---|
| 11,784,733 | B2* | 10/2023 | Gao | H04B 7/088 |
| | | | | 370/252 |
| 11,985,613 | B2* | 5/2024 | Ko | H04L 5/0048 |
| 2018/0035276 | A1* | 2/2018 | Kang | H04W 72/02 |
| 2020/0304253 | A1 | 9/2020 | Choi et al. | |
| 2021/0184984 | A1* | 6/2021 | Ganesan | H04L 47/56 |
| 2022/0231898 | A1* | 7/2022 | Li | H04L 27/2678 |
| 2023/0254789 | A1* | 8/2023 | Ryu | H04L 27/26025 |
| | | | | 370/329 |

OTHER PUBLICATIONS

Supplementary European Search Report—EP19955685—Search Authority—Munich—Jul. 21, 2023.
International Search Report and Written Opinion—PCT/CN2019/124749—ISAEPO—Aug. 31, 2020.
Mediatek Inc: "Discussions on NR DL Beam Management", 3GPP Draft, 3GPP TSG RAN WG1 AH_NR Meeting, R1-1710808, Qingdao, China, Jun. 27-30, 2017, 7 Pages.
VIVO: "Beam Management and Beam Reporting", 3GPP Draft, 3GPP TSG RAN WG1 Meeting #90, R1-1712836, Prague, P.R. Czech, Aug. 21-25, 2017, 7 Pages.

* cited by examiner

DEVICE-TO-DEVICE PERIODIC SIGNAL CONFIGURATION

CROSS-REFERENCE TO RELATED APPLICATION

This application is a 371 national stage of Patent Cooperation Treaty (PCT) Application No. PCT/CN2019/124749 filed on Dec. 12, 2019, entitled "DEVICE-TO-DEVICE PERIODIC SIGNAL CONFIGURATION," which is hereby expressly incorporated by reference herein.

INTRODUCTION

Aspects of the present disclosure generally relate to wireless communication and to techniques and apparatuses for relaying a discovery signal to a remote user equipment (UE).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first user equipment (UE), may include transmitting a first set of periodic signals associated with a first set of spatial relationships in a first set of periodic signal transmission occasions associated with a first periodicity; and transmitting one or more second sets of periodic signals with a second set of spatial relationships in one or more second sets of periodic signal transmission occasions associated with a second periodicity, wherein the one or more second sets of periodic signal transmission occasions occur before a next first set of the periodic signal transmission occasions.

In some aspects, a first UE for wireless communication may include memory and one or more processors coupled to the memory. The memory and the one or more processors may be configured to transmit a first set of periodic signals associated with a first set of spatial relationships in a first set of periodic signal transmission occasions associated with a first periodicity; and transmit one or more second sets of periodic signals with a second set of spatial relationships in one or more second sets of periodic signal transmission occasions associated with a second periodicity, wherein the one or more second sets of periodic signal transmission occasions occur before a next first set of the periodic signal transmission occasions.

In some aspects, a non-transitory computer-readable medium may store one or more instructions for wireless communication. The one or more instructions, when executed by one or more processors of a first UE, may cause the one or more processors to: transmit a first set of periodic signals associated with a first set of spatial relationships in a first set of periodic signal transmission occasions associated with a first periodicity; and transmit one or more second sets of periodic signals with a second set of spatial relationships in one or more second sets of periodic signal transmission occasions associated with a second periodicity, wherein the one or more second sets of periodic signal transmission occasions occur before a next first set of the periodic signal transmission occasions.

In some aspects, an apparatus for wireless communication may include means for transmitting a first set of periodic signals associated with a first set of spatial relationships in a first set of periodic signal transmission occasions associated with a first periodicity; and means for transmitting one or more second sets of periodic signals with a second set of spatial relationships in one or more second sets of periodic signal transmission occasions associated with a second periodicity, wherein the one or more second sets of periodic signal transmission occasions occur before a next first set of the periodic signal transmission occasions.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

In some communications systems, such as 5G, a first user equipment (UE), which may be termed a relay UE, may relay information between a second UE, which may be termed a remote UE, and a base station (BS). For example, device-to-device communications, such as sidelink communications, vehicle-to-vehicle (V2V) communications, vehicle-to-everything (V2X) communications, and/or the like, may enable relay UEs to provide extended coverage to remote UEs. This may enable power-savings by the remote UEs by reducing a transmit power to communicate with the BS, reducing a signaling that the remote UEs are to monitor, and/or the like.

A relay UE may transmit a periodic signal to the remote UE to maintain communication with the remote UE. For example, the relay UE may transmit a discovery signal to enable the remote UE to identify the relay UE for use in communicating with a BS or with the relay UE, itself. Additionally, or alternatively, the relay UE may transmit periodic signals for sidelink beam management, for providing synchronization information (e.g., a primary synchronization signal (PSS), a secondary synchronization signal (SSS), and/or the like), and/or the like. The relay UE may transmit the periodic signals in accordance with a duty cycle with a fixed periodicity. In each set of transmission occasions, the relay UE may transmit a set of periodic signals using a set of spatial relationships to enable one or more remote UEs to identify the relay UE. The spatial relationships may include, for example, a certain beam and/or a certain quasi co-location relationship (QCL) type D for a transmission, signal, and/or a channel.

However, in some cases, the relay UE may be serving a relatively small quantity of remote UEs. For example, in a wearable device context, a smart phone-type of relay UE may service a single smart watch-type of remote UE. As a result, the relay UE may transmit some of the set of periodic signals with some of the set of spatial relationships or beams without a remote UE being available for reception.

Some aspects described herein enable dual-duty cycles for periodic signal transmission in device-to-device communications. For example, a relay UE may use a first duty cycle with a first periodicity for transmitting a first set of periodic signals (e.g., a full set of discovery signals) and may use a second duty cycle with a second periodicity for transmitting a second set of periodic signals (e.g., a subset of the full set of discovery signals). In this way, the relay UE enables a reduced utilization of network resources and a reduced transmitting energy by avoiding transmission of all configured periodic signals with all configured spatial relationships at each transmission opportunity. Moreover, the remote UE may reduce energy consumption by measuring and/or responding to fewer periodic signals.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
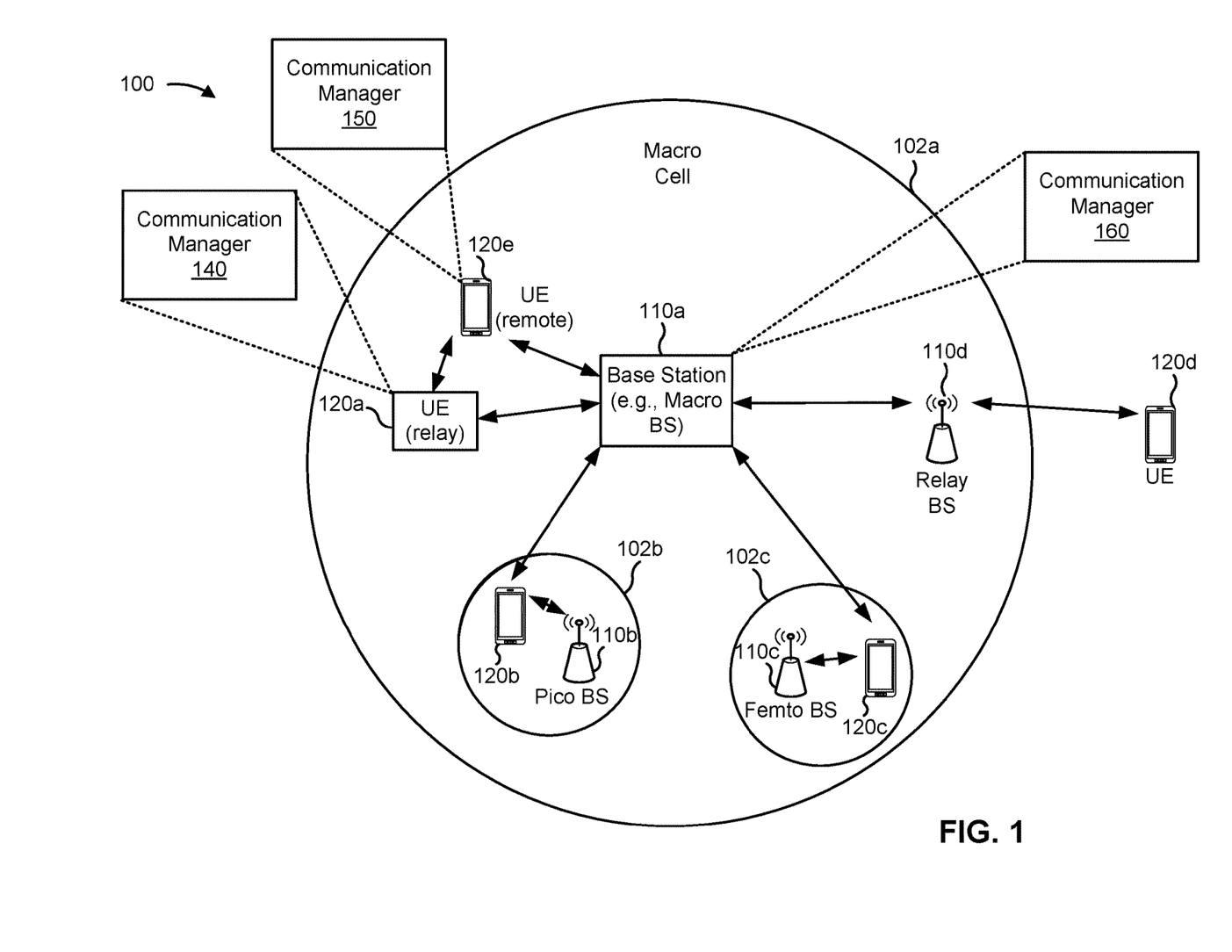
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced.

The wireless network 100 may be an LTE network, a 5G or NR network, and/or the like. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity.

A relay UE, such as UE 120a, may relay communications between a BS (e.g., BS 110a) and a remote UE (e.g., remote UE 120e). In some aspects, the relay UE may relay all communications between the remote UE and the BS. In some aspects, the relay UE may relay a portion of communications, such that the remote UE is in direct communication with the BS for another portion of communications, as shown.

A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120a may include a communication manager 140. As described in more detail elsewhere herein, the communication manager 140 may transmit a first set of periodic signals associated with a first set of spatial relationships in a first set of periodic signal transmission occasions associated with a first periodicity, transmit one or more second sets of periodic signals with a second set of spatial relationships in one or more second sets of periodic signal transmission occasions associated with a second periodicity, and/or the like. Additionally, or alternatively, the communication manager 140 may perform one or more other operations described herein. Similarly, the UE 120e may include a communication manager 150 that may receive one or more of the first set of periodic signals, one or more of the one or more second sets of periodic signals, and/or the like. Additionally, or alternatively, the communication manager 150 may perform one or more other operations described herein.

Similarly, the base station 110 may include a communication manager 160. As described in more detail elsewhere herein, the communication manager 160 may transmit signaling to configure a duty cycle, such as a first duty cycle corresponding to a first periodicity of the first set of periodic signals, a second duty cycle corresponding to a second periodicity of the one or more second sets of periodic signals, and/or the like. Additionally, or alternatively, the communication manager 160 may perform one or more other operations described herein.

As indicated above, FIG. 1 is provided merely as an example. Other examples may differ from what is described with regard to FIG. 1.

Figure 2:
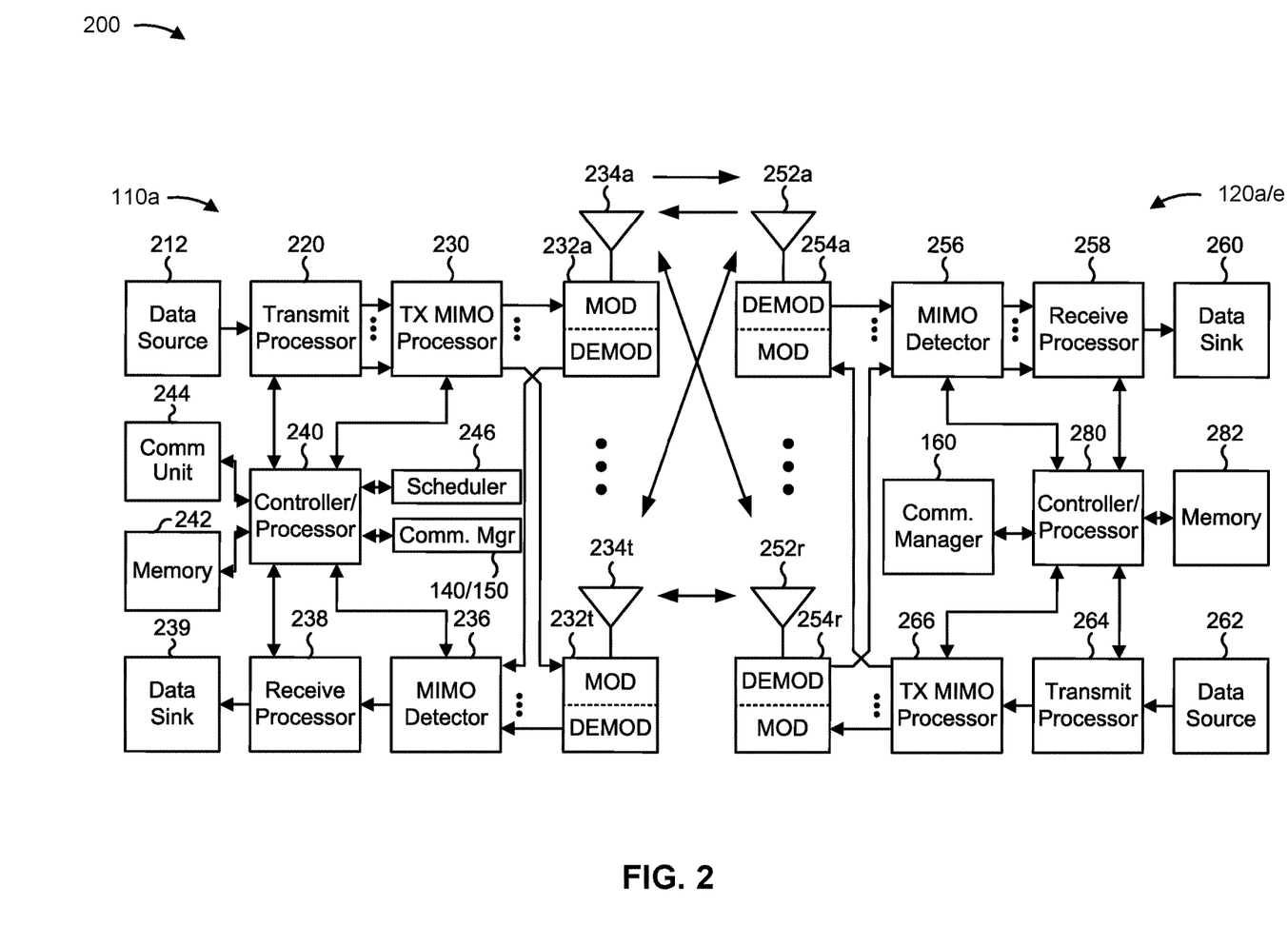
FIG. 2 is a block diagram conceptually illustrating an example of a base station in communication with a UE in a wireless communication network, in accordance with various aspects of the present disclosure.

FIG. 2 shows a block diagram of a design 200 of base station 110a and UE 120a/e, which may be one of the base stations and one of the UEs in FIG. 1. Base station 110a may be equipped with T antennas 234a through 234t, and UE 120a/e may be equipped with R antennas 252a through 252r, where in general T≥1 and R≥1.

At base station 110a, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120a/e, antennas 252a through 252r may receive the downlink signals from base station 110a, from another UE (e.g., UE 120e may receive signals from UE 120a and vice versa) and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120a/e to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120a/e may be included in a housing.

On the uplink, at UE 120a/e, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110a. At base station 110a, the uplink signals from UE 120a/e and other UEs may be received by antennas 234, processed by demodulators 232, detected by a MIMO detector 236 if applicable, and further processed by a receive processor 238 to obtain decoded data and control information sent by UE 120a/e. Receive processor 238 may provide the decoded data to a data sink 239 and the decoded control information to controller/processor 240. Base station 110a may include communication unit 244 to communicate with a network controller.

Controller/processor 240 of base station 110a, controller/processor 280 of UE 120a/e, and/or any other component(s) of FIG. 2 may perform one or more techniques associated with device-to-device periodic signal configuration, as described in more detail elsewhere herein. For example, controller/processor 240 of base station 110a, controller/processor 280 of UE 120a/e, and/or any other component(s) of FIG. 2 may perform or direct operations of, for example, process 400 of FIG. 4 and/or other processes as described herein. Memories 242 and 282 may store data and program codes for base station 110a and UE 120a/e, respectively. A scheduler 246 may schedule UEs for data transmission on the downlink and/or uplink.

In some aspects, the UE 120a may include means for transmitting a first set of periodic signals associated with a first set of spatial relationships in a first set of periodic signal transmission occasions associated with a first periodicity, means for transmitting one or more second sets of periodic signals with a second set of spatial relationships in one or more second sets of periodic signal transmission occasions associated with a second periodicity, and/or the like. Additionally, or alternatively, the UE 120a may include means for performing one or more other operations described herein. In some aspects, such means may include the communication manager 140. Additionally, or alternatively, such means may include one or more components of the UE 120a described in connection with FIG. 2.

As indicated above, FIG. 2 is provided merely as an example. Other examples may differ from what is described with regard to FIG. 2.

Figure 3:
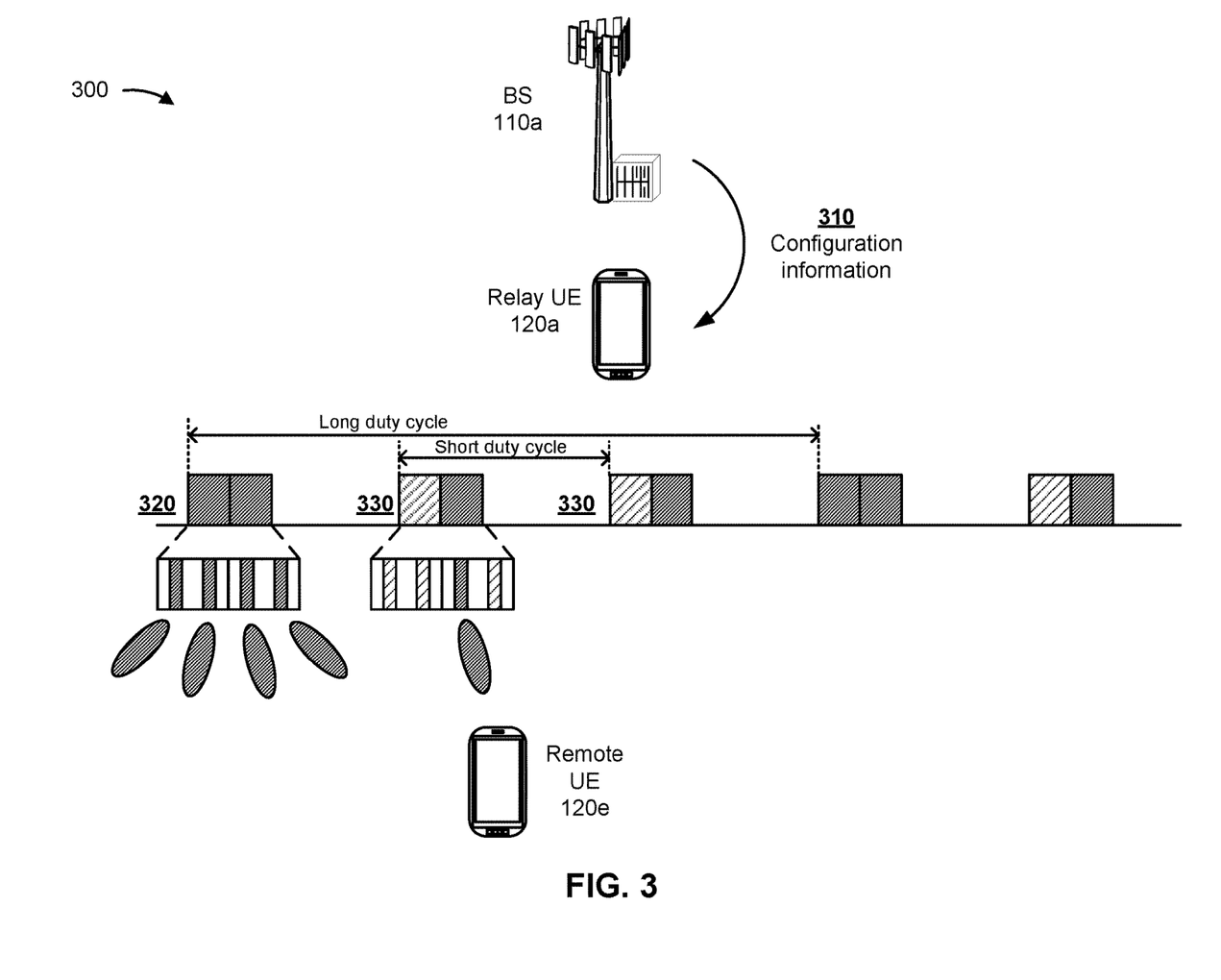
FIG. 3 is a diagram illustrating an example of device-to-device periodic signal configuration, in accordance with various aspects of the present disclosure.

FIG. 3 is a diagram illustrating an example 300 of device-to-device periodic signal configuration, in accordance with various aspects of the present disclosure.

As shown in FIG. 3, and by reference number 310, relay UE 120a may receive, from BS 110a, configuration information. For example, relay UE 120a may receive configuration information identifying a first periodicity of a first duty cycle for transmitting periodic signals, a second periodicity of a second duty cycle for transmitting periodic signals, and/or the like. In this case, the first periodicity may be an integer multiple of the second periodicity. For example, the first periodicity may be 16 frames (160 milliseconds (ms)), 32 frames (320 ms), 64 frames (640 ms), and/or higher quantities of frames and the second periodicity may be 2 frames (20 ms), 4 frames (40 ms), 8 frames (80 ms), 16 frames (160 ms), and/or higher quantities of frames. Additionally, or alternatively, relay UE 120*a* may determine the first and/or second periodicity based at least in part on the first and/or second periodicity being pre-defined in a specification and/or information associated therewith being stored in a memory. In some aspects, the first and/or second periodicity (and one or more periodic signal transmission occasions associated therewith) may be defined based at least in part on a quantity of system frames, a quantity of system subframes, a quantity of slots, a number of time units (e.g., a quantity of milliseconds), a combination thereof, and/or the like.

In some aspects, the periodic signals may be discovery signals. For example, relay UE 120*a* may determine a plurality of different duty cycles for transmitting sidelink discovery signals. Additionally, or alternatively, the periodic signals may be synchronization signal block (SSB) transmissions (e.g., sidelink SSB transmissions), channel state information (CSI) reference signal (RS) transmissions, a combination thereof, and/or the like. For example, relay UE 120*a* may determine a periodicity for an SSB transmission that may include a PSS, an SSS, a physical broadcast channel (PBCH) signal, a combination thereof, and/or the like.

In some aspects, relay UE 120*a* may determine the first and/or second periodicity based at least in part on receiving a relay request from remote UE 120*e*. For example, remote UE 120*e* may transmit a relay request to initiate relaying of communications with BS 110 and relay UE 120*a* may receive the relay request and determine the first and/or second periodicity to enable transmission of periodic signals to configure relaying. In this case, the relay request may include an indication of a spatial relationship that relay UE 120*a* is to use to communicate with remote UE 120*e*. For example, remote UE 120*e* may provide information to identify a spatial relationship to use for the second duty cycle to ensure that remote UE 120*e* can receive a periodic transmission transmitted in the second duty cycle, as shown. In this case, the spatial relationships may include, for example, a certain beam and/or a certain quasi co-location relationship (QCL) type D for a transmission, signal, and/or a channel Additionally, or alternatively, relay UE 120*a* may receive a wake-up signal and may transmit one or more of the periodic signals based at least in part on receiving the wake-up signal. In some aspects, relay UE 120*a* may receive the relay request or wake-up signal during a gap offset before one or more second sets of periodic signals, as described herein.

As further shown in FIG. 3, and by reference number 320, relay UE 120*a* may transmit a first set of periodic signals. For example, relay UE 120*a* may transmit, at a start of a first duty cycle, a first set of discovery signals to enable remote UE 120*e* to detect relay UE 120*a*. As shown by reference number 330, relay UE 120*a* may transmit one or more second sets of periodic signals. For example, between successive occurrences of the first set of periodic signals, relay UE 120*a* may transmit one or more second sets of periodic signals to remote UE 120*e* using a periodicity associated with a second duty cycle. In some aspects, the first set of discovery signals may be general to any remote UE 120 and the second set of discovery signals may be specific to remote UE 120*e*, or vice versa.

In some aspects, relay UE 120*a* may transmit, to remote UE 120*e*, one or more types of periodic signals. For example, relay UE 120*a* may transmit one or more discovery signals, SSBs (e.g., with a PSS, an SSS, a PBCH, and/or the like), CSI RSs (e.g., for the one or more second sets of periodic signals), and/or the like.

In some aspects, the one or more second set of periodic signals may be different from the first set of periodic signals. For example, relay UE 120*a* may transmit the first set of periodic signals with a first set of spatial relationships and may transmit the one or more second sets of periodic signals with a second set of spatial relationships. In this case, the second set of spatial relationships may be a subset of the first set of spatial relationships, as shown. Additionally, or alternatively, the second set of spatial relationships may be a different set of spatial relationships than the first set of spatial relationships. In some aspects, each of the one or more second sets of periodic signals may be associated with a different set of spatial relationships. For example, relay UE 120*a* may transmit a first one of the one or more second sets of periodic signals with a first spatial relationship and may transmit a second one of the one or more second sets of periodic signals with a second spatial relationship.

As indicated above, FIG. 3 is provided as an example. Other examples may differ from what is described with respect to FIG. 3.

Figure 4:
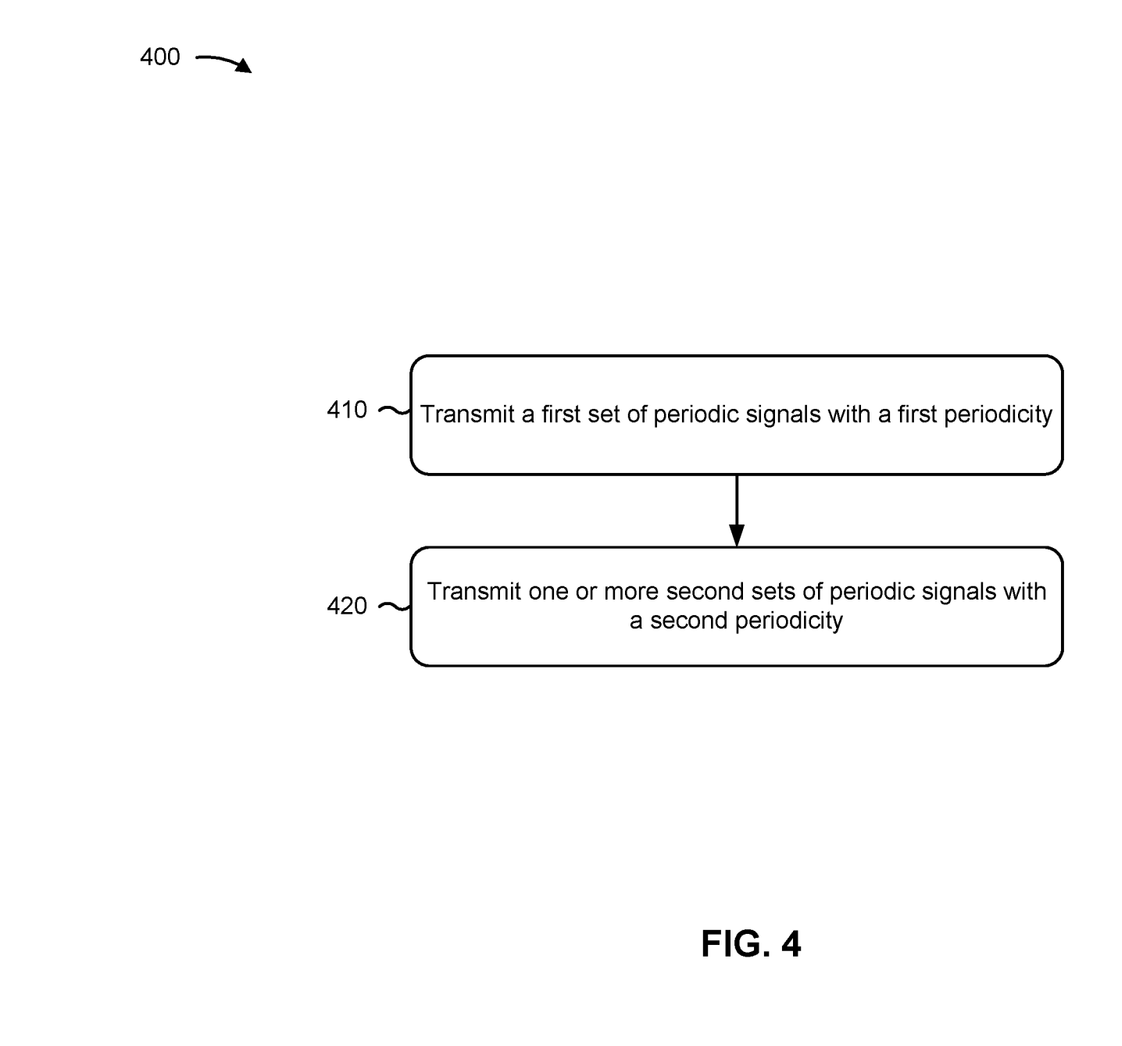
FIG. 4 is a diagram illustrating an example process performed, for example, by a relay user equipment, in accordance with various aspects of the present disclosure.

FIG. 4 is a diagram illustrating an example process 400 performed, for example, by a first UE, in accordance with various aspects of the present disclosure. Example process 400 is an example where the first UE (e.g., UE 120*a* and/or the like) performs operations associated with device-to-device periodic signal configuration.

As shown in FIG. 4, in some aspects, process 400 may include transmitting a first set of periodic signals with a first periodicity (block 410). For example, the first UE (e.g., using controller/processor 280, transmit processor 264, TX MIMO processor 266, MOD 254, antenna 252, and/or the like) may transmit a first set of periodic signals associated with a first set of spatial relationships in a first set of periodic signal transmission occasions associated with a first periodicity, as described above.

As further shown in FIG. 4, in some aspects, process 400 may include transmitting one or more second sets of periodic signals with a second periodicity (block 420). For example, the first UE (e.g., using controller/processor 280, transmit processor 264, TX MIMO processor 266, MOD 254, antenna 252, and/or the like) may transmit one or more second sets of periodic signals with a second set of spatial relationships in one or more second sets of periodic signal transmission occasions associated with a second periodicity, as described above. In some aspects, the one or more second sets of periodic signal transmission occasions occur before a next first set of the periodic signal transmission occasions.

Process 400 may include additional aspects, such as any single aspect or any combination of aspects described below and/or in connection with one or more other processes described elsewhere herein.

In a first aspect, the first set of periodic signals or the one or more second sets of periodic signals include at least one of a discovery signal, a synchronization signal block, a channel state information reference signal, or a combination thereof.

In a second aspect, alone or in combination with the first aspect, the synchronization signal block includes at least one of a device-to-device primary synchronization signal, a device-to-device secondary synchronization signal, a device-to-device broadcast channel signal, or a combination thereof.

In a third aspect, alone or in combination with one or more of the first and second aspects, the second set of spatial relationships is a subset of the first set of spatial relationships.

In a fourth aspect, alone or in combination with one or more of the first through third aspects, the second set of spatial relationships is a subset of a third set of spatial relationships different from the first set of spatial relationships.

In a fifth aspect, alone or in combination with one or more of the first through fourth aspects, the first periodicity is an integer multiple of the second periodicity.

In a sixth aspect, alone or in combination with one or more of the first through fifth aspects, the one or more second sets of periodic signals includes a device-to-device channel state information reference signal.

In a seventh aspect, alone or in combination with one or more of the first through sixth aspects, a first subset of the one or more second sets of periodic signals uses a first subset of the second set of spatial relationships and a second subset of the one or more second sets of periodic signals uses a second subset of the second set of spatial relationships.

In an eighth aspect, alone or in combination with one or more of the first through seventh aspects, at least one of the one or more second sets of periodic signals does not include any periodic signal for transmission.

In a ninth aspect, alone or in combination with one or more of the first through eighth aspects, process 400 includes receiving a relay request from a remote UE; and determining the second set of spatial relationships based at least in part on the relay request.

In a tenth aspect, alone or in combination with one or more of the first through ninth aspects, process 400 includes identifying the first set of periodic signal transmission occasions or the one or more second sets of periodic signal transmission occasions based at least in part on at least one of: a system frame number, a system subframe number, a slot index, or a combination thereof.

In an eleventh aspect, alone or in combination with one or more of the first through tenth aspects, process 400 includes receiving, from a remote UE, a first UE signaling, wherein the first UE signaling is being a relay-request signal or a wake-up signal; and transmitting, to the remote UE, at least one of the first set of periodic signals or the one or more second sets of periodic signals based at least in part on receiving the first UE signaling.

In a twelfth aspect, alone or in combination with one or more of the first through eleventh aspects, the first UE signaling includes an indication of at least one spatial relationship of the first set of spatial relationships or the second set of spatial relationships.

In a thirteenth aspect, alone or in combination with one or more of the first through twelfth aspects, the first UE signaling is received in a gap offset before the one or more second sets of periodic signals.

In a fourteenth aspect, alone or in combination with one or more of the first through thirteenth aspects, process 400 includes receiving information identifying at least one of the first periodicity or the second periodicity.

In a fifteenth aspect, alone or in combination with one or more of the first through fourteenth aspects, the first periodicity is a pre-defined periodicity.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first user equipment (UE), comprising:

transmitting a first set of periodic signals associated with a first set of spatial relationships in a first set of periodic signal transmission occasions associated with a first periodicity; and transmitting one or more second sets of periodic signals with a second set of spatial relationships in one or more second sets of periodic signal transmission occasions associated with a second periodicity, wherein the one or more second sets of periodic signal transmission occasions occur before a next first set of the periodic signal transmission occasions.

2. The method of claim 1, wherein the first set of periodic signals or the one or more second sets of periodic signals include at least one of:
a discovery signal,
a synchronization signal block,
a channel state information reference signal, or
a combination thereof.

3. The method of claim 2, wherein the synchronization signal block includes at least one of:
a device-to-device primary synchronization signal,
a device-to-device secondary synchronization signal,
a device-to-device broadcast channel signal, or
a combination thereof.

4. The method of claim 1, wherein the second set of spatial relationships is a subset of the first set of spatial relationships.

5. The method of claim 1, wherein the second set of spatial relationships is a subset of a third set of spatial relationships different from the first set of spatial relationships.

6. The method of claim 1, wherein the first periodicity is an integer multiple of the second periodicity.

7. The method of claim 1, wherein the one or more second sets of periodic signals includes a device-to-device channel state information reference signal.

8. The method of claim 1, wherein a first subset of the one or more second sets of periodic signals uses a first subset of the second set of spatial relationships and a second subset of the one or more second sets of periodic signals uses a second subset of the second set of spatial relationships.

9. The method of claim 1, wherein at least one of the one or more second sets of periodic signals does not include any periodic signal for transmission.

10. The method of claim 1, further comprising:
receiving a relay request from a second UE; and
determining the second set of spatial relationships based at least in part on the relay request.

11. The method of claim 1, further comprising:
identifying the first set of periodic signal transmission occasions or the one or more second sets of periodic signal transmission occasions based at least in part on at least one of: a system frame number, a system subframe number, a slot index, or a combination thereof.

12. The method of claim 1, further comprising:
receiving, from a second UE, a first UE signaling, wherein the first UE signaling is a relay-request signal or a wake-up signal; and
transmitting, to the second UE, at least one of the first set of periodic signals or the one or more second sets of periodic signals based at least in part on receiving the first UE signaling.

13. The method of claim 12, wherein the first UE signaling includes an indication of at least one spatial relationship of the first set of spatial relationships or the second set of spatial relationships.

14. The method of claim 12, wherein the first UE signaling is received in a gap offset before the one or more second sets of periodic signals.

15. The method of claim 1, further comprising:
receiving information identifying at least one of the first periodicity or the second periodicity.

16. The method of claim 1, wherein the first periodicity is a pre-defined periodicity.

17. A first user equipment (UE) for wireless communication, comprising:
a memory; and
one or more processors coupled to the memory, the memory and the one or more processors configured to:
transmit a first set of periodic signals associated with a first set of spatial relationships in a first set of periodic signal transmission occasions associated with a first periodicity; and
transmit one or more second sets of periodic signals with a second set of spatial relationships in one or more second sets of periodic signal transmission occasions associated with a second periodicity, wherein the one or more second sets of periodic signal transmission occasions occur before a next first set of the periodic signal transmission occasions.

18. A non-transitory computer-readable medium storing one or more instructions for wireless communication, the one or more instructions comprising:
one or more instructions that, when executed by one or more processors of a first user equipment (UE), cause the one or more processors to:
transmit a first set of periodic signals associated with a first set of spatial relationships in a first set of periodic signal transmission occasions associated with a first periodicity; and
transmit one or more second sets of periodic signals with a second set of spatial relationships in one or more second sets of periodic signal transmission occasions associated with a second periodicity, wherein the one or more second sets of periodic signal transmission occasions occur before a next first set of the periodic signal transmission occasions.

19. An apparatus for wireless communication, comprising:
means for transmitting a first set of periodic signals associated with a first set of spatial relationships in a first set of periodic signal transmission occasions associated with a first periodicity; and
means for transmitting one or more second sets of periodic signals with a second set of spatial relationships in one or more second sets of periodic signal transmission occasions associated with a second periodicity, wherein the one or more second sets of periodic signal transmission occasions occur before a next first set of the periodic signal transmission occasions.

* * * * *